M. McKINNEY.
DRILL HITCH.
APPLICATION FILED DEC. 12, 1916.

1,249,648.

Patented Dec. 11, 1917.

Inventor
Morel McKinney
By
Attorney

UNITED STATES PATENT OFFICE.

MORD McKINNEY, OF ROUNDUP, MONTANA.

DRILL-HITCH.

1,249,648.  Specification of Letters Patent.  Patented Dec. 11, 1917.

Application filed December 12, 1916. Serial No. 136,454.

*To all whom it may concern:*

Be it known that MORD McKINNEY, a citizen of the United States of America, residing at Roundup, in the county of Musselshell and State of Montana, has invented certain new and useful Improvements in Drill-Hitches, of which the following is a specification.

My invention relates to new and useful improvements in drill hitches in which means are provided for attaching a plurality of drills, or other agricultural implements, for use with traction engines; and the objects of my invention are, first to provide a draft apparatus which is so arranged as to overcome any swing or uneven tension, causing one side to become more advanced than the other; second, to afford means whereby the agricultural implements will all be drawn over the land in such a manner as to avoid skipping any of the ground whether level or otherwise.

I attain these objects by the apparatus illustrated in the accompanying drawing in which—

Figure 1:
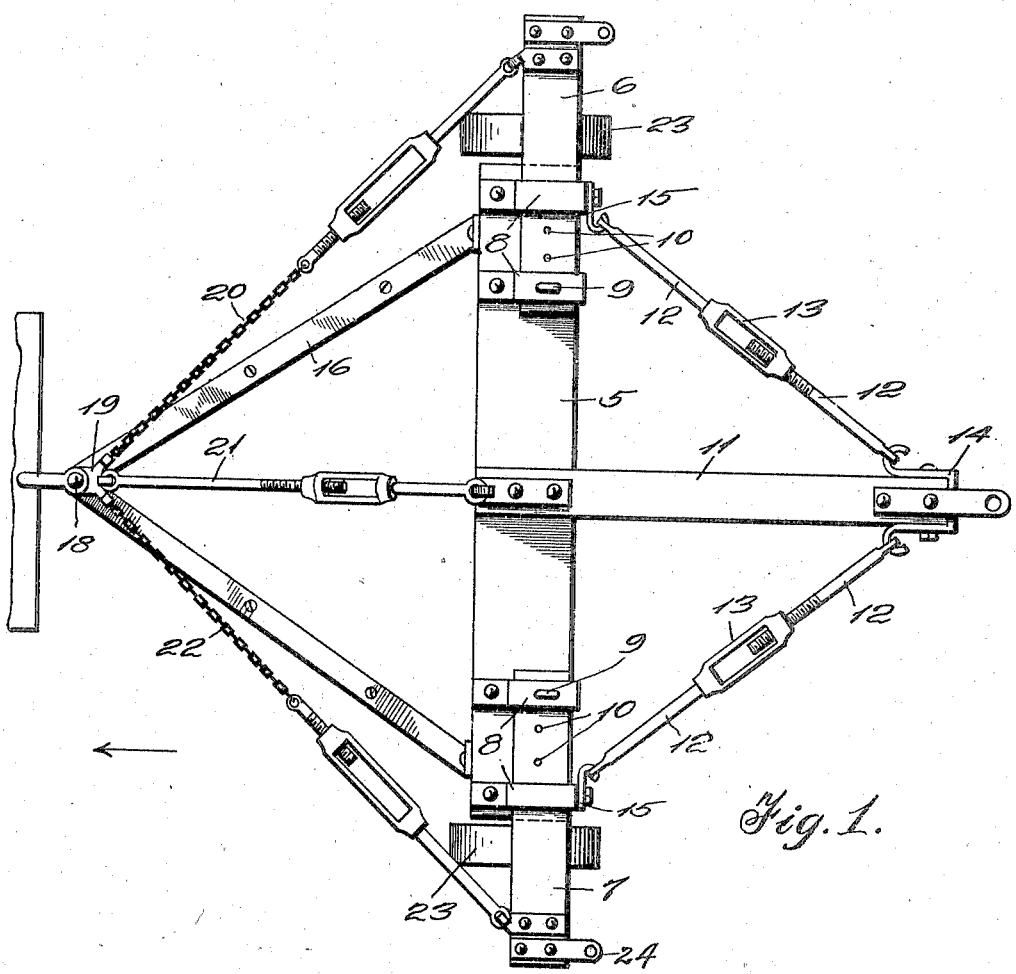
Figure 2:
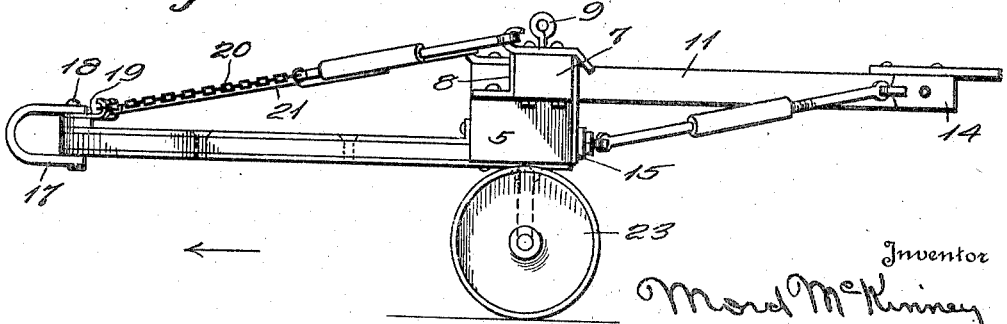

Figure 1 is a plane view of the entire apparatus showing the same attached to the end of a traction engine, and Fig. 2 is a side elevation of the same.

A main cross portion 5 is provided and has mounted thereon adjustable arms 6 and 7 which are secured thereto by means of straps 8. Said arms may be laterally adjusted to fit different size drills or disks and may be held in any desired position by means of the pins 9, 9, which fit into the holes 10, in said arms through openings in the two center-most strap members.

Attached to the top of the central part of the main cross portion 5, and extending rearwardly therefrom, is an arm 11. Said arm 11 is maintained in rigid relation to the main cross portion 5 by means of brace rods, said brace rods being composed of eye-bolts 12, 12 which screw thread into turn buckles 13, 13, for the purpose of maintaining the proper tension. The brace rods are detachably attached at their forward ends to said member 5 and at their rear ends to hooks formed upon the ends of a U-shaped member 14. The detachable means for securing the eye-bolts to the cross bar 5 may be of any desired construction but I preferably employ hook members 15 for this purpose.

Extending forwardly from the member 5 is a V-shaped draw bar 16 which may be of any desired construction, but the preferred construction is to laminate the same having upper and lower V-shaped members of metal and a wooden filler therebetween. This draw bar carries at its forward end a clevis 17 attached thereto by pin 18. Mounted upon said pin and between the clevis and the draw bar I provide a hook member 19 having three projections thereon adapted to engage three brace members 20, 21, and 22, all of which extend rearwardly from said cross bar 5, and have means for lengthening and shortening.

Beneath the cross bar 5 I mount depending stub axles which carry wheels 23. I provide attaching members 24, upon the outer ends of the adjustable arms 6 and 7 and upon the rear end of the member 11 to which the agricultural devices to be drawn are attached.

It will thus be seen that I have provided a very simple and strong drill hitch to accomplish the purposes set forth.

Having described my invention what I claim is:

1. A device of the type described, including a central transverse wheel-mounted member, provided with longitudinally adjustable end-members, a V-shaped draw-bar having its divergent ends fixed to the forward side of said central transverse wheel-mounted member, a plurality of brace-members having a common clevis-connection with said V-shaped draw-bar, at the point of convergence of its constituent members, and connection with said transverse wheel-mounted member and said longitudinally adjustable end-members respectively, a rearwardly extending arm whose forward end is fixed about centrally to said transverse wheel-mounted member, said arm having means for its attachment to an agricultural implement, and brace-members effecting connection between said arm at its rear end and said transverse wheel-mounted member at its ends.

2. A device of the type described, including a central transverse wheel-mounted member, provided with endwise-adjustable end-members, a V-shaped draw-bar having its divergent ends fixed to said transverse wheel-mounted member at the ends thereof, a plurality of brace-members, having their rear ends connected to said endwise adjustable end-members, respectively, a triple-hook ended member having connection with the clevis-attaching member of said drawbar, said plurality of brace-members having their forward ends connected to the hooks of said triple hook-ended member, a rearwardly extending arm secured at its forward end to said wheel-mounted transverse member about centrally thereof, and brace-members connected at their ends to said rearwardly extending arm, at its rear end, and to said wheel-mounted transverse member at the ends thereof, respectively, all of said brace-members comprising longitudinally adjustable sections.

In testimony whereof I affix my signature.

MORD McKINNEY.

Copies of this patent may be obtained for five cents each, by addressing the "Commissioner of Patents, Washington, D. C."